United States Patent
Handford (10) Patent No.: US 6,222,137 B1
(45) Date of Patent: *Apr. 24, 2001

(54) DOLLY TYPE DRUM SCALE

(75) Inventor: Charles E. Handford, Hillard, OH (US)

(73) Assignee: Wayac Inc., Hilliard, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,822

(22) Filed: Aug. 4, 1998

(51) Int. Cl.[7] .......................... G01G 21/00; G01G 19/08
(52) U.S. Cl. .......................... 177/126; 177/130; 177/140
(58) Field of Search .................... 177/126, 127, 177/130, 131, 132, 133, 134, 140, 148, 244

(56) References Cited

U.S. PATENT DOCUMENTS

| | | | |
|---|---|---|---|
| 324,668 | * 8/1885 | Dollison et al. | 177/140 |
| 344,762 | * 6/1886 | Witherell et al. | 177/126 |
| 1,239,457 | * 9/1917 | Buschman | 177/126 |
| 1,528,899 | * 3/1925 | Thomas | 177/126 |
| 2,403,204 | * 7/1946 | Feld | 177/134 |
| 2,430,702 | * 11/1947 | Bohannan | 177/134 |
| 2,706,626 | * 4/1955 | Reiser | 177/126 |
| 2,776,133 | * 1/1957 | Bates | 177/126 |
| 2,823,911 | * 2/1958 | Murphy | 177/126 |
| 3,472,329 | * 10/1969 | Smith | 177/134 |
| 3,596,725 | * 8/1971 | Homs | 177/126 |
| 3,743,040 | 7/1973 | Hutchinson et al. | 177/126 |
| 3,935,914 | * 2/1976 | Nordstrom et al. | 177/134 |
| 3,995,708 | * 12/1976 | Hutchinson et al. | 177/126 |
| 4,002,215 | * 1/1977 | Harvill | 177/146 |
| 4,203,497 | * 5/1980 | Harris et al. | 177/134 |
| 4,258,814 | 3/1981 | Dillon | 177/126 |
| 5,203,419 | 4/1993 | Douglas | 177/244 |
| 5,219,032 | 6/1993 | Keen | 177/73 |
| 5,417,536 | 5/1995 | Cech | 414/21 |
| 5,482,421 | * 1/1996 | Cummins et al. | 177/140 |
| 5,612,515 | 3/1997 | Eisen | 177/126 |
| 5,990,423 | * 11/1999 | Ashpes et al. | 177/140 |
| 5,994,649 | * 11/1999 | Garfinkle et al. | 177/25.11 |

OTHER PUBLICATIONS

*Calculus with Analytic Geometry*, Munen et al., Worth publishers, New York, N.Y., pp 759–763, 1978.*

* cited by examiner

Primary Examiner—Randy W. Gibson
(74) Attorney, Agent, or Firm—Standley & Gilcrest LLP (57) ABSTRACT

A portable scale for weighing drums, cylinders and other containers is describe. The scale is lightweight and easily transportable and due to the use of three load cells instead of the traditional four, it is highly accurate even on uneven floor surfaces. The weighing platform is low to the ground and has a loading ramp making placement of objects to be weighed easier.

10 Claims, 8 Drawing Sheets

DOLLY TYPE DRUM SCALE

BACKGROUND AND SUMMARY OF INVENTION

The present invention relates generally to floor scales, and more specifically electronic floor scales for weighing drums, cylinders and other such containers.

Generally, scales of this type consist of: one or more load cells, a platform or deck, and a controller with a digital readout. The load cells are normally affixed to the platform and make contact with the floor. Items to be weighed, such as drums containing chemicals, are placed onto the deck. Load cells are sensors that send electrical impulses to the controller, enabling it to calculate and display the weight of the object being weighed.

Typically, scales used in industry for weighing containers are designed to be placed in a fixed location and containers must be brought to it to be weighed. This is a drawback in many industrial settings where stock may be spread out over a large area of the facility and the containers are heavy and cumbersome to move. Some scale designs have attempted to overcome this difficulty by being transportable by incorporating wheels into their design. However, due to the uneven floor surfaces in most industrial facilities, such scales may be inaccurate in their weight measurement.

Another disadvantage of existing scales, including portable scales, is that the load deck is supported by a substructure, causing the platform surface to be elevated some inches above the ground, forcing the user to lift the heavy container off of the floor in order to place it onto the deck. This also adds to the weight of the scale itself, with most models exceeding two hundred pounds.

The present invention overcomes the disadvantages of the known art and provides a lightweight, portable method of weighing large containers with a high degree of accuracy. The present invention offers a simple and unique alternative to existing industrial floor scales for weighing drums, cylinders and other heavy containers.

The present invention provides a generally triangular scale deck instead of the rectangular variety normally employed. This leads to the preferred use of three load cells, rather than the four used in known designs. As a result, all of the load cells may contact the floor surface simultaneously and distribute the load more evenly, even on uneven floors. This significantly improves the accuracy of the weight measurement, and can eliminate a need to readjust the apparatus upon relocation, which may be required with models having a four-point contact with the floor surface.

The present invention preferably incorporates a load deck with no under-deck substructure, such as channel members used in known scales. Instead, the deck has one or more structural breaks or bends, of the kind typically used in the automotive industry for strengthening body panels, giving it the necessary strength and rigidity to support the drum or other object to be weighed. This decreases the overall weight of the scale and allows the platform surface to be located close to the floor surface making it easier to place an object on it. The present invention may also include a load ramp built into the deck, adding to the relative ease in loading.

The present invention preferably incorporates dolly-type wheels and a handle attached to a vertical member extending up from the deck. This allows the scale to be readily transported from one location to the next, even with an object to be weighed in place on its deck. Additionally, the handle and vertical member may be attached in such a way that they easily break down so that the scale may be shipped via a standard parcel carrier as one unit.

The present invention may also incorporate a readily available electronic controller that is attached above the handle in such a way that it rotates about the vertical axis of the support member. In this way, the displayed weight can be viewed from a convenient location. The controller unit preferably is stopped from rotating completely about said axis to protect the wires that connect it to the load cells from being torn or otherwise damaged.

The present invention is described more fully in the following drawings and description:

DETAILED DESCRIPTION OF PREFERRED EMBODIMENT

Referring now to FIGS. 1 to 6, there is shown a dolly-type drum scale 10. Scale 10 comprises a base 12, a column 14, a controller unit 16, and a handle 18.

Base 12 comprises a weighing platform 20 being generally triangular in shape and two rigid frame members 22, said base 12 being formed by preferably bending a single piece of sheet metal. A third rigid frame member 23 is affixed to proximal edge 24 of platform 20 by welding or other known securing means. Frame members 22, 23 are referred to as "L-channels", having a cross-sectional shape comprising two sides meeting at a right angle. Base 12 additionally comprises a wheel assembly 25. Platform 20 is strengthened by the addition of two bends, referred to as structural breaks. A structural break 26 bisects platform 20, running from the proximal edge 24 to the distal edge 32. A second structural break 28 is located near, and runs parallel to distal edge 32 of platform 20. Break 28 serves a secondary purpose by forming a loading ramp 34 to facilitate the placement of objects to be weighed onto weighing platform 20 by causing distal edge 32 to be closer to the floor surface.

When scale 10 is in its resting position as shown in FIGS. 1 to 6, three known load cells 40 contact the floor surface and support scale 10, distributing its weight substantially equally. Best seen in FIGS. 4 and 6, each load cell 40 preferably comprises a pedestal 42 and a strain gauge 44. Pedestals 42 are attached to strain gauges 44 by a pivotal means 46 near the distal ends 48 of strain gauges 44, allowing bottom surface 50 of pedestals 42 to maintain good contact with the floor surface even when it is uneven. A plurality of bolts 52 affixes the top surfaces 54 of strain gauges 44 near their proximal ends 56 to frame members 22, 23. Load cells 40 located on side frame members 22 are each surrounded on three sides by a metal shield 57 that is welded or otherwise affixed to each frame member 22.

Figure 8:
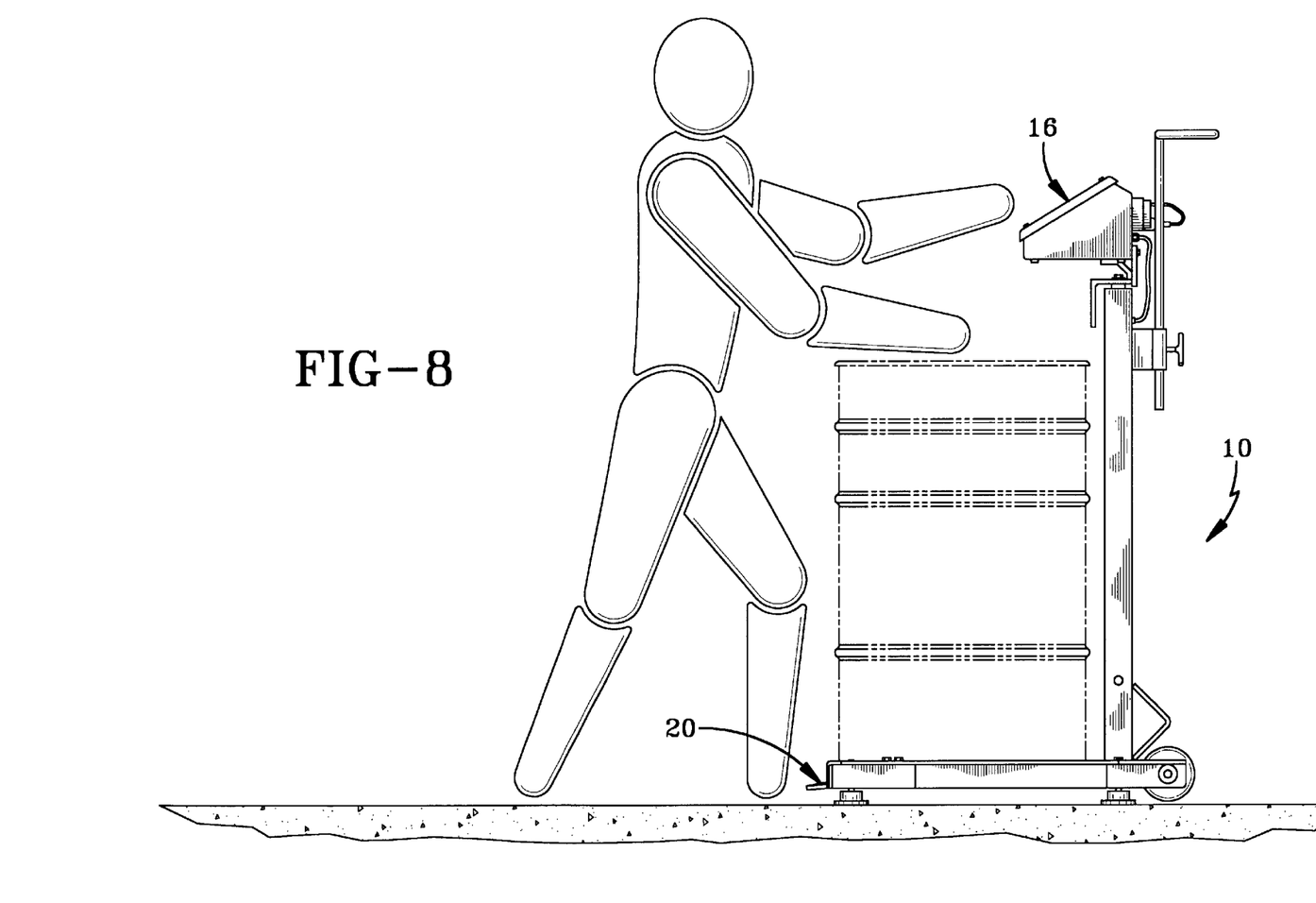
FIG. 8 is a side elevation view showing a preferred embodiment of the present invention in use.

Strain gages 44 are electrically coupled to controller 16 by a plurality of insulated wires which run under frame members 22 and inside of column 14. As illustrated in FIG. 8, when a load is placed on weighing platform 20, strain gauges 44 are caused to change their shape and thus their electrical resistance. Based on the sum of the electrical resistance of three strain gauges 44, controller 16 calculates the weight of the load object and displays the result on a numeric display 60.

Figure 1:
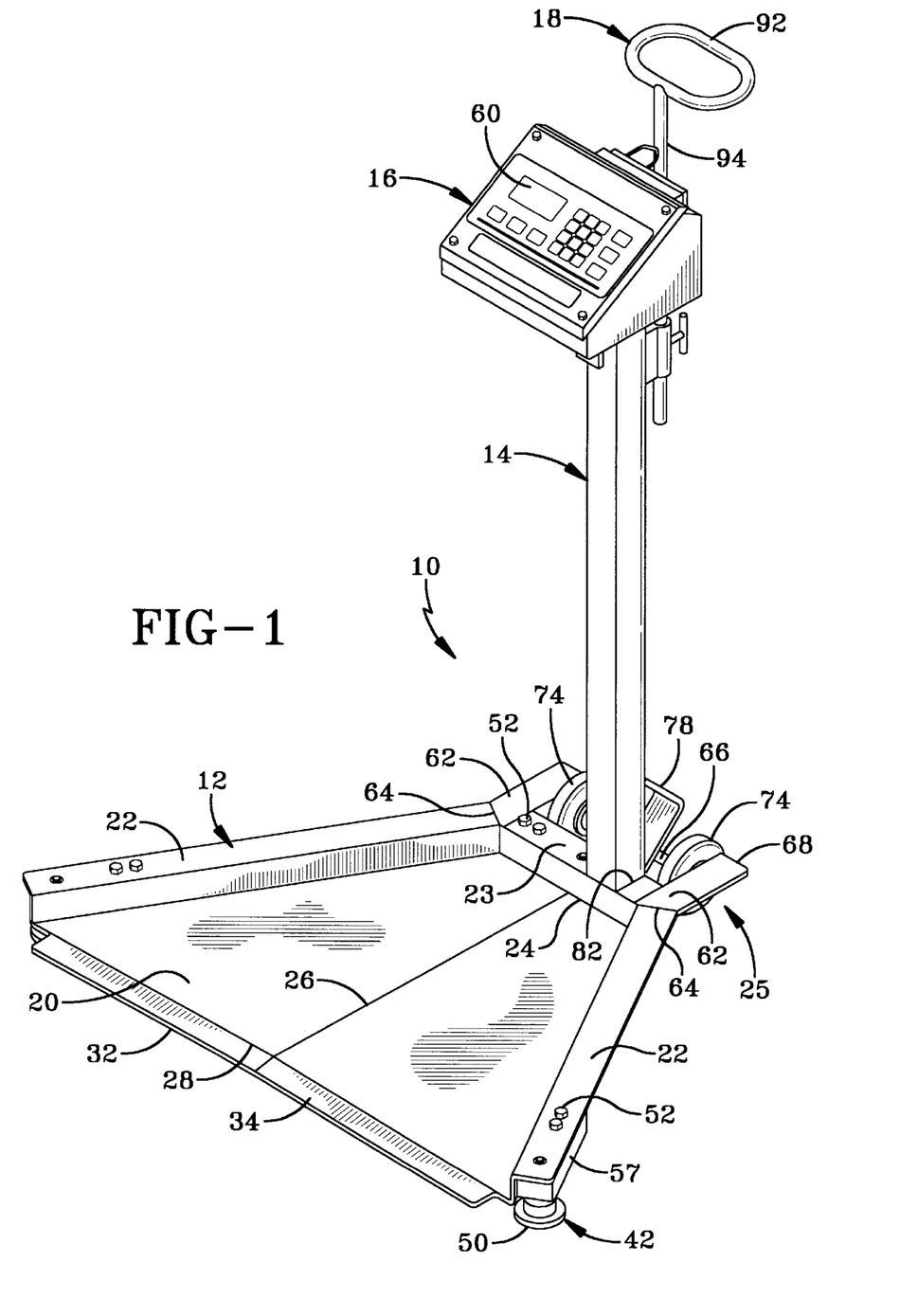
FIG. 1 is a perspective view of a preferred embodiment of the present invention.
Figure 2:
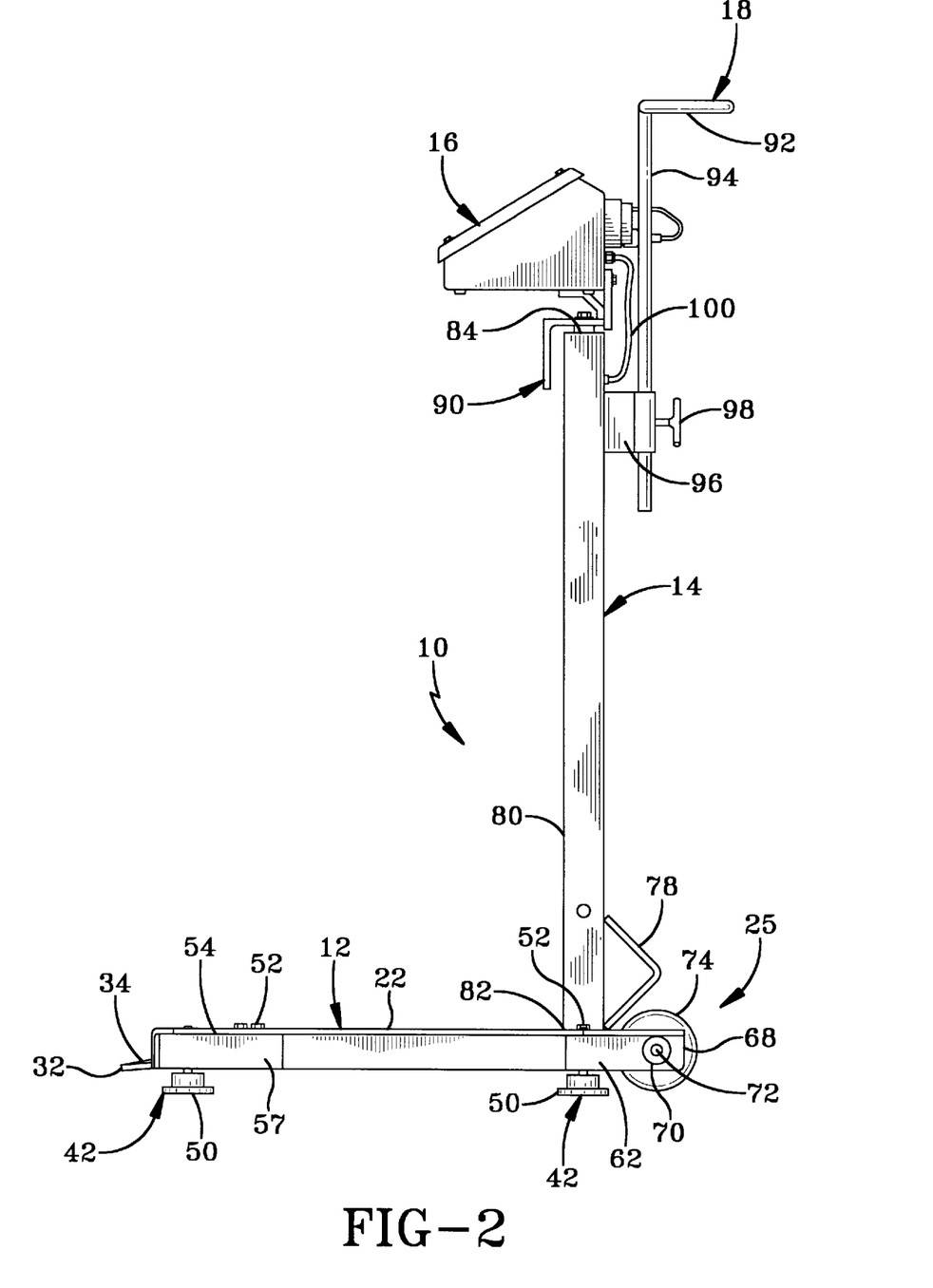
FIG. 2 is a side elevation view of a preferred embodiment of the present invention.
Figure 3:
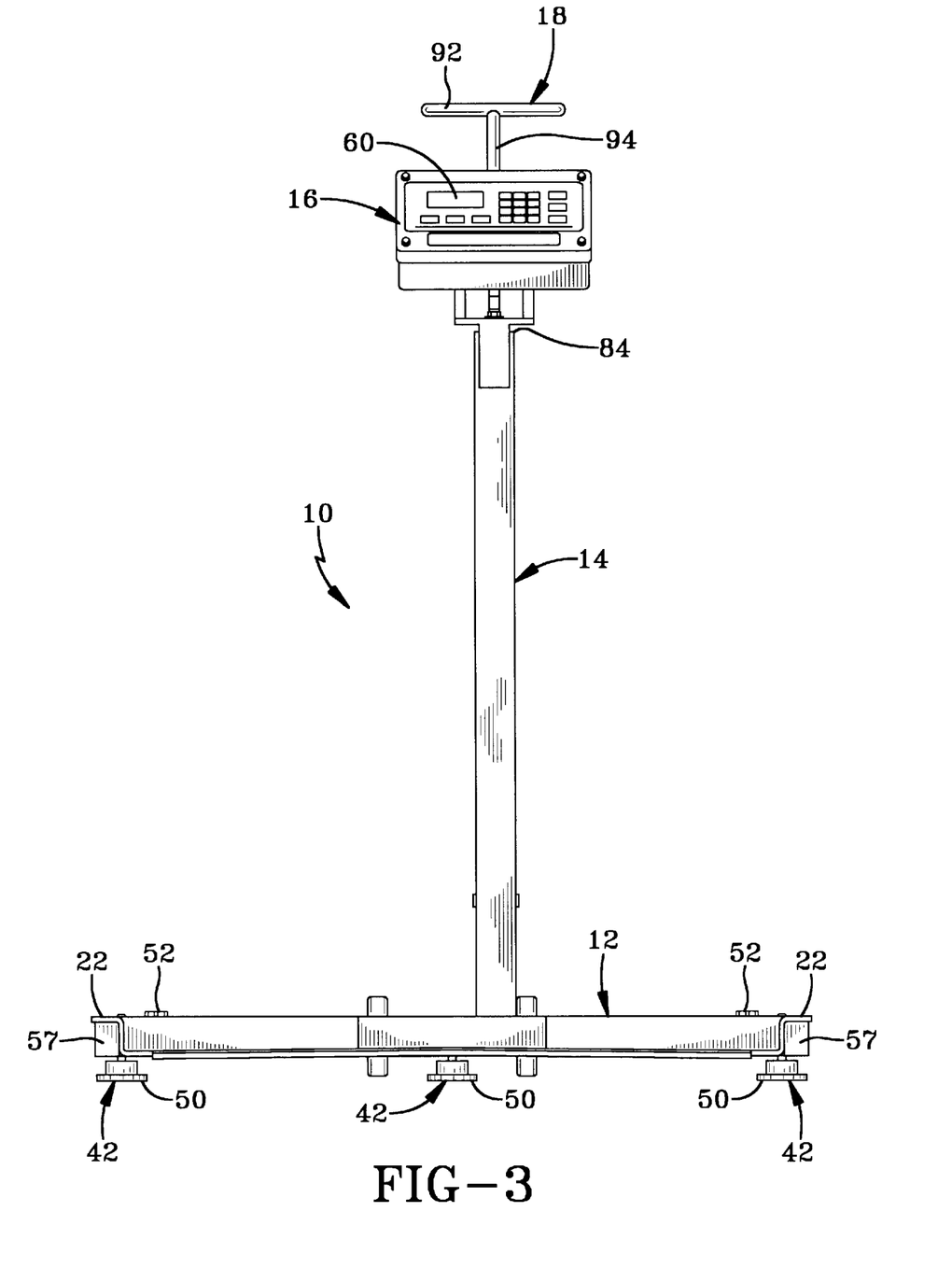
FIG. 3 is a front elevation view of a preferred embodiment of the present invention.
Figure 4:
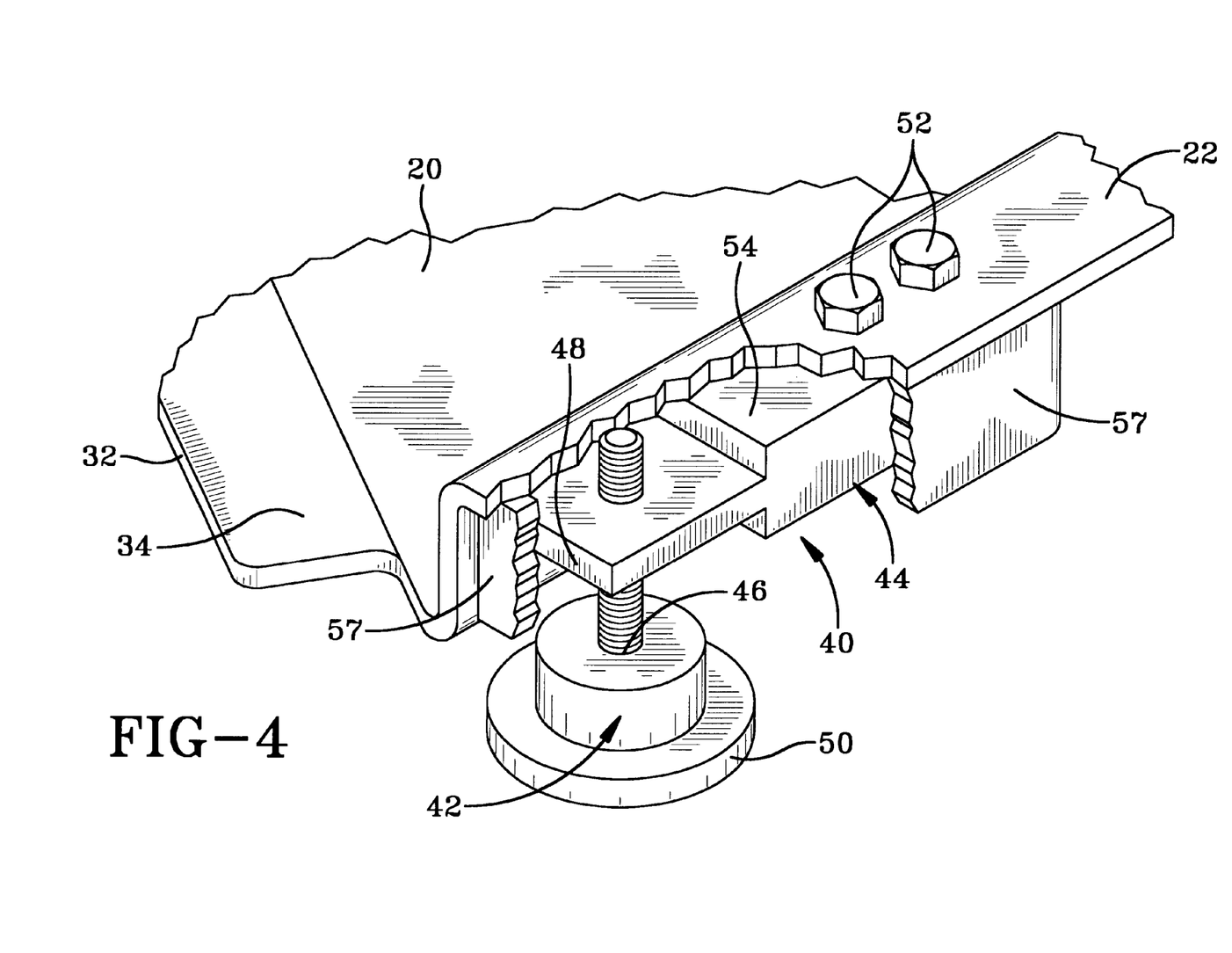
FIG. 4 is a perspective view of a load cell portion of a preferred embodiment of the present invention.
Figure 5:
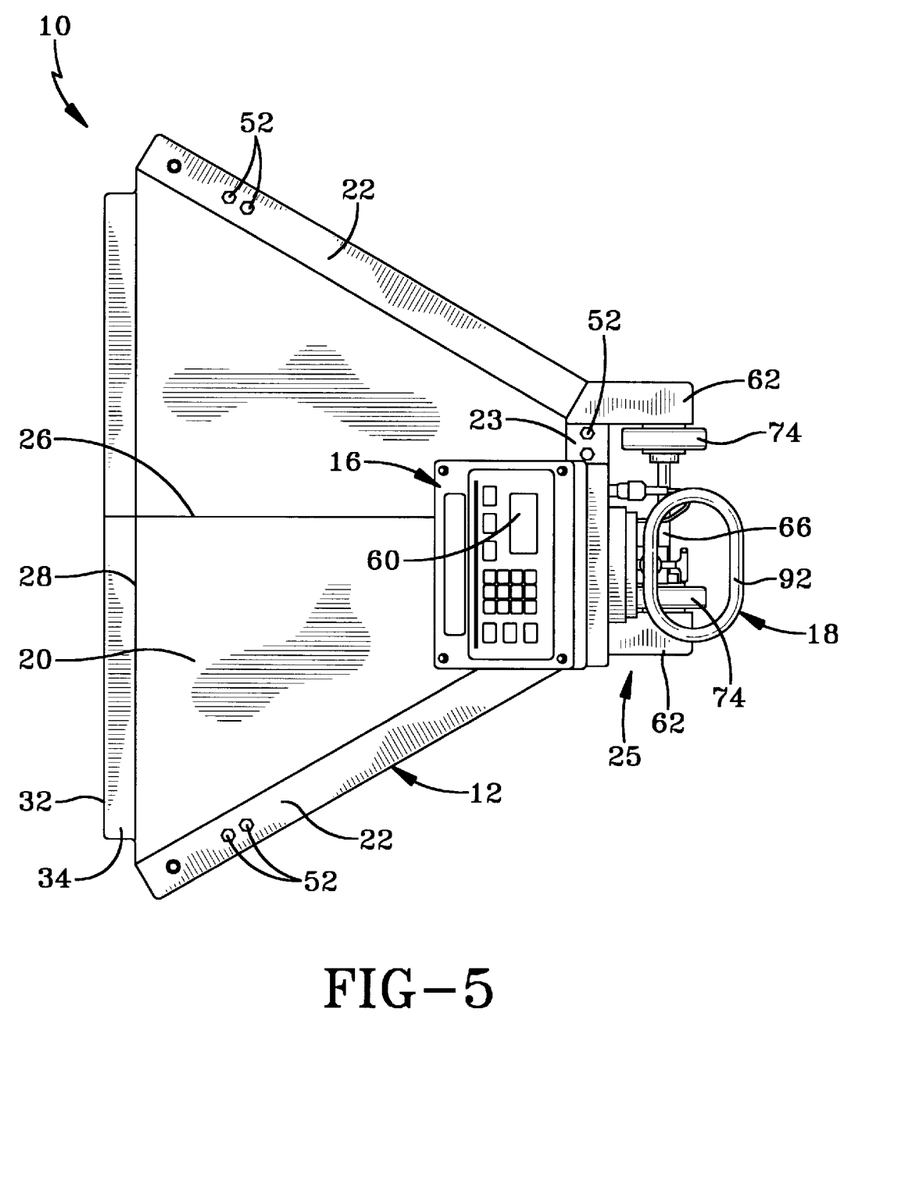
FIG. 5 is a top plan view of a preferred embodiment of the present invention.
Figure 6:
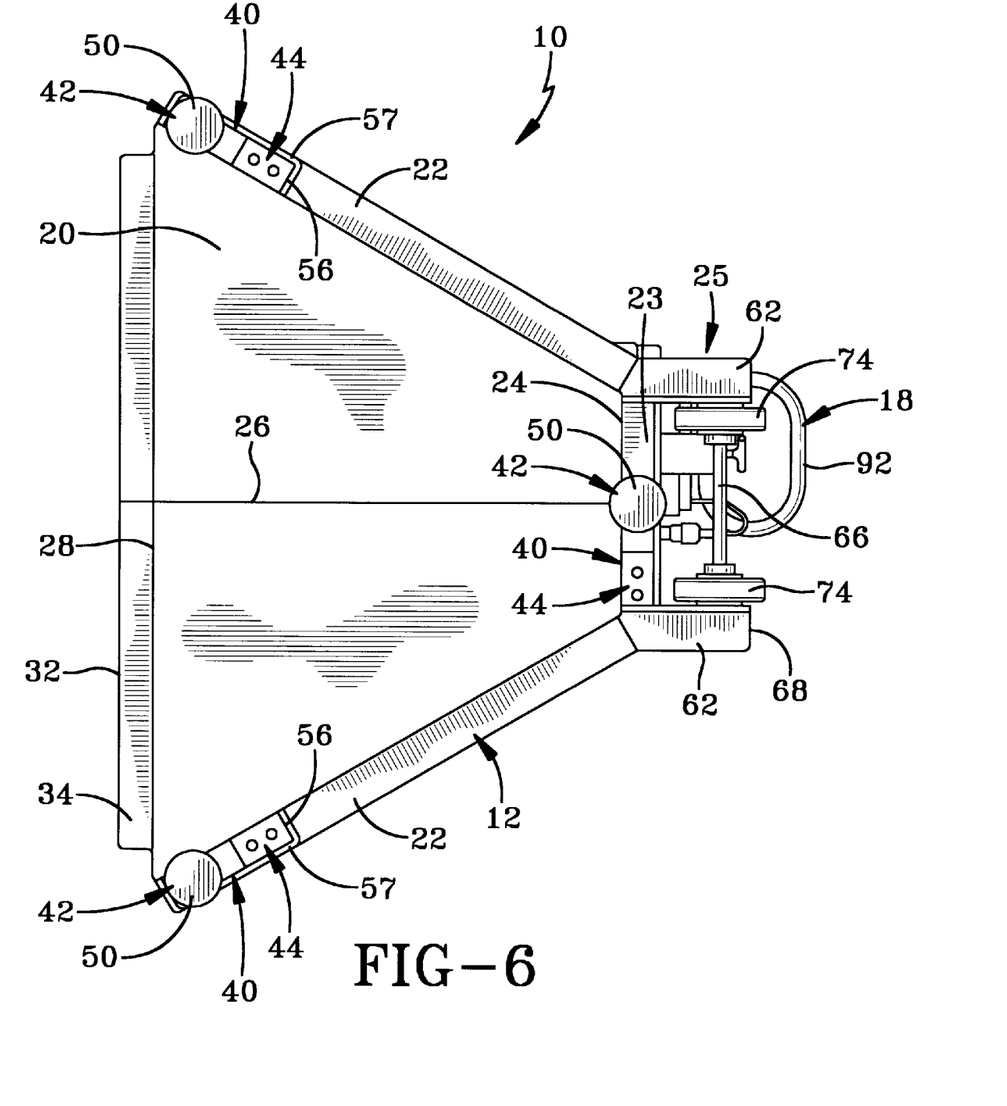
FIG. 6 is a bottom plan view of a preferred embodiment of the present invention.

Still referring to FIGS. 1 to 6, but best shown by FIG. 6, wheel assembly 25 comprises two L-channel frame members 62, each affixed by welding or other means to proximal ends 64 of frame members 22, forming right angles with frame member 23. A cylindrical shaft 66 fixed between the members 62 of wheel assembly 25 near the distal ends 68 being secured by a collar 70 on each end 72 of shaft 66. Two wheels 74 are attached onto shaft 66 between members 62, in such a manner which allow wheels 74 to rotate freely about shaft 66 while arresting any lateral motion across shaft 66. When scale 10 is in its upright position, resting on load cells 42, wheels 74 preferably do not touch the floor surface.

Column 14 is affixed at its distal end 76 to frame member 23 by bolting or other detachable means and extends upward. Column 14 can by detached and collapsed against base 12 in order to ship scale 10 via parcel carrier as one unit. A foot extension 78, which comprises a single metal bar bent at a right angle, is affixed to the rear surface 80 of column 14 near its proximal end 82. Controller unit 16 is affixed to distal end 84 of column 14 by means of a mounting bracket 90 in such a way which allows controller 16 to rotate freely about column 14 allowing numeric display 60 to be viewed from many positions.

Handle 18 comprises a hoop portion 92 affixed by welding to a cylindrical portion 94. A flanged collar 96 is affixed by welding or other means to rear surface 80 of column 14 near distal end 84. Handle 18 is affixed through collar 96 by means of a thumb screw 98 tightened onto cylindrical portion 94. Thumb screw 98 may be loosened to allow the height of handle 18 to be lowered or raised depending upon the needs of the individual user. The position of handle 18, as it is affixed to column 14, prevents controller 16 from being rotated completely about column 14 and thus preventing the wires 100 of controller 16 from being damaged.

Figure 7:
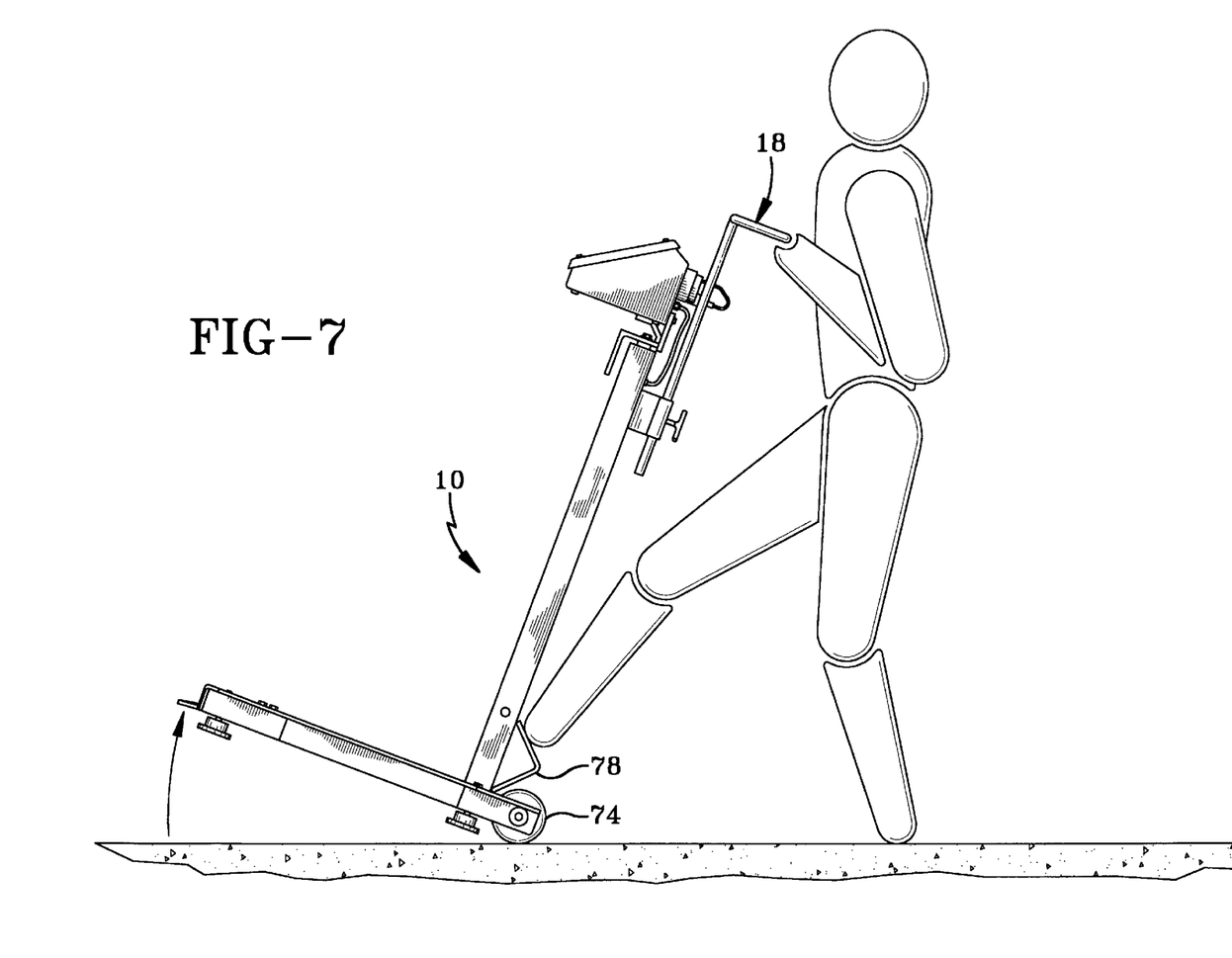
FIG. 7 is a side elevation view showing a preferred embodiment of the present invention being transported for use.

As illustrated in FIG. 7, when a user desires to relocate scale 10, he or she presses his or her foot against foot extension 78 while manually pulling back and down on handle 18. This action causes scale 10 to tilt backward and rest entirely on wheels 74. Once scale 10 is in this position, it may be easy moved to a new location. Additionally, a load may be in place on weighing platform 20 during the relocation of scale 10.

The preferred embodiment herein disclosed is not intended to be exhaustive or to unnecessarily limit the scope of the invention. The preferred embodiment was chosen and described in order to explain the principles of the present invention so that others skilled in the art may practice the invention. Having shown and described a preferred embodiment of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A portable scale for weighing containers, comprising:
   a) a load platform being generally triangular in shape for supporting objects to be weighed;
   b) three (3) load cells mounted to said platform each of said load cells affixed at one end to said load platform, one of said load cells near a first corner of said load platform, one of said load cells near a second corner of said load platform, and one of said load cells near a third corner of said load platform, each of said load cells affixed at the other end to a pivotal pedestal provided for contacting the ground;
   c) a column extending upright from said platform;
   d) at least one wheel in association with said platform; and
   e) an electronic controller in association with said three (3) load cells for displaying the weight of a container located on said platform;
      whereby each of said pivotal pedestals makes solid contact with the ground even when said load platform resides on an uneven surface;
      thereby allowing an accurate weight measurement of said container to be obtained.

2. The drum scale of claim wherein said platform for supporting objects to be weighed comprises a sheet metal deck surface strengthened by the existence of at least one bend.

3. The drum scale of claim 2 wherein said platform further comprises a ramp extending from one edge.

4. The drum scale of claim 1 wherein said controller is adapted to rotate about said column.

5. The drum scale of claim 1 further comprising a handle secured to said column.

6. The drum scale of claim 5 wherein said handle is adjustable in height.

7. The drum scale of claim 1 wherein said column is collapsible against said platform for shipping.

8. The drum scale of claim 4 in which said column is collapsible against said platform for shipping.

9. A drum scale for weighing containers comprising:
   a) a load platform being generally triangular in shape for supporting objects to be weighed, said load platform comprising a sheet metal deck strengthened by the existence of at least one bend, said platform further comprising a loading ramp formed by bending a portion of said load platform toward the floor surface;
   b) three load cells mounted to said load platform, each of said load cells attached at one end to said load platform, one of said load cells near a first corner of said load platform, one of said load cells near a second corner of said load platform, and one of said load cells near a third corner of said load platform, such that said load cells form substantially a triangle, each of said load cells attached at the other end to a pivotal pedestal extending downward from said load platform and provided to contact said floor surface;
   c) a column extending upright from said load platform at a proximal end, said column also having a distal end, said column being hollow;
   d) two wheels, in association with said load platform, not contacting said floor surface when said load cells are in contact with said floor surface;
   e) a foot extension affixed to said column near its said proximal end;

f) a handle attached near said distal end of said column, and;

g) an electronic controller being connected electronically by wires extending through said hollow portion of said column to said three load cells, said electronic controller for displaying the weight of a container located on said platform, said electronic controller being attached to said distal end of said column and adapted to rotate about said column, said rotation being limited to less than 360 degrees by the placement of said handle;

whereby each of said pivotal pedestals makes solid contact with the ground even when said load platform resides on an uneven surface;

thereby allowing an accurate weight measurement of said container to be obtained.

10. A drum scale for weighing containers comprising:

a) a load platform being generally triangular in shape for supporting objects to be weighed, said load platform comprising a sheet metal deck;

b) three load cells mounted to said load platform, each of said load cells attached at one end to said load platform, one of said load cells near a first corner of said load platform, one of said load cells near a second corner of said load platform, and one of said load cells near a third corner of said load platform, such that said load cells form substantially a triangle, each of said load cells attached at the other end to a pivotal pedestal extending downward from said load platform and provided to contact said floor surface;

c) a column extending upright from said platform at a proximal end, said column also having a distal end;

d) at least one wheel, in association with said platform, not contacting the floor surface when said load cells are in contact with said floor surface;

e) a handle in association with said column, and;

f) an electronic controller being connected electronically by wires to said three load cells, for displaying the weight of a container located on said platform, said electronic controller being attached to said distal end of said column by a means which allows for rotation of said electronic controller about said column;

whereby each of said pivotal pedestals makes solid contact with the ground even when said load platform resides on an uneven surface;

thereby allowing an accurate weight measurement said container to be accurately obtained and displayed on said electronic controller.

\* \* \* \* \*